United States Patent [19]

Dapo

[11] Patent Number: 4,885,660

[45] Date of Patent: Dec. 5, 1989

[54] ELECTROLYTIC CAPACITOR FOR USE IN A WIDE TEMPERATURE RANGE AND HIGH VOLTAGES

[75] Inventor: Roland F. Dapo, Columbia, S.C.

[73] Assignee: North American Philips Corporation, New York, N.Y.

[21] Appl. No.: 345,398

[22] Filed: May 1, 1989

[51] Int. Cl.$^4$ .............................................. H01G 9/02
[52] U.S. Cl. ..................................... 361/506; 252/62.2
[58] Field of Search ............... 252/62.2; 361/314, 315, 361/504, 505, 506

[56] References Cited

U.S. PATENT DOCUMENTS

| | | | |
|---|---|---|---|
| 3,931,552 | 1/1976 | Anderson et al. | 252/62.2 X |
| 4,447,346 | 5/1984 | MacNamee et al. | 252/62.2 |
| 4,479,166 | 10/1984 | Finkelstein et al. | 252/62.2 X |
| 4,774,011 | 9/1988 | Mori et al. | 252/62.2 |
| 4,786,429 | 11/1988 | Mori et al. | 252/62.2 |
| 4,812,951 | 3/1989 | Melody et al. | 361/504 |

Primary Examiner—Donald A. Griffin
Attorney, Agent, or Firm—Norman N. Spain

[57] ABSTRACT

An electrolytic capacitor having aluminum anode and cathode members separated by an insulating spacer impregnated with an electrolyte which is free of dibasic acids including citric acid. The electrolyte consists essentially of a solution of boric acid and an amine having a molecular weight of not greater than 175 in a mixture of a member of the group consisting of butzrolactone, dimethylacetamide and dimechylformamide and mixtures of dimethylacetamide and dimethylformamide in a major amount and a polyalkylene glycol having a molecular weight of not greater thann 2000 in a minor amount. The capacitor is adapted for use at a medium to high operating voltage and over a wide temperature range and to develop little or no gas even when operated at voltages above 200.

10 Claims, 3 Drawing Sheets

ELECTROLYTIC CAPACITOR FOR USE IN A WIDE TEMPERATURE RANGE AND HIGH VOLTAGES

BACKGROUND OF THE INVENTION

This invention relates to an improved electrolytic capacitor.

In particular the invention in the instant application relates to an electrolytic capacitor having aluminum anode and cathode members and exhibiting a long life in a wide temperature range and at a medium to high operating voltage.

An aluminum electrolytic capacitor capable of exhibiting a relative long life in an extended temperature range is disclosed in Burger et al. Canadian Pat. No. 694,909.

This patent shows an electrolytic capacitor having an aluminum anode and an aluminum cathode separated by an insulating spacer impregnated with an electrolyte. As the electrolyte a solution in dimethylformamide and ethylene glycol of boric acid and citric acid and an organic amine.

The scintillation (or breakdown) voltage of this electrolyte is high. For example at 85° C. on aluminum it is about 410V. Capacitors employing this electrolyte have good electrical properties when operated at voltages up to about 200V. However when operated at voltages in excess of 200V these capacitors frequently generate a large amount of gas and show failures due to the development of shorts.

SUMMARY OF THE INVENTION

A principal object of this invention is to provide an electrolytic capacitor having aluminum anode and cathode members useful in a wide temperature range and for operating at a medium to high voltage. A further object of this invention is to provide an electrolytic capacitor having aluminum anode and cathode members which have a long life while operating under these conditions. An additional object of this invention is to provide an electrolytic capacitor of this type that generate little or no gas when operated at voltages in excess of 200.

According to the invention the applicant has produced a new and novel electrolytic capacitor having aluminum anode and cathode members separated by an insulating spacer impregnated with a new and improved electrolyte.

This new electrolyte of the invention is free of aliphatic dibasic acids including citric acid and consists essentially of a solution of boric acid and an amine having a molecular weight of not greater than about 175 in a mixture of a member of the group consisting of butyrolactone, dimethylacetamide and dimethylformamide and mixtures of dimethylacetamide and dimethylformamide in a major amount and a polyalkylene glycol having a molecular weight of not greater than about 2000 in a minor amount.

The novel capacitors of the invention have been found to be particularly adapted for use at a medium to high operating voltage and over a wide temperature range. These capacitors exhibit a long operating life. Unlike the capacitors of the Burger et al patent these capacitors develop little or no gas even when operated at voltages above 200.

Consequently the number of shorts developed is significantly decreased and the operating lives of the capacitors of the invention is significantly longer than the capacitors of the Burger et al patent particularly when operated at voltages in excess of 200 volts. Further these capacitors have been found to exhibit long lives even when operated at temperatures as low as −40° C. and as high as 105° C.

DETAILED DESCRIPTION OF THE INVENTION

Figure 1:
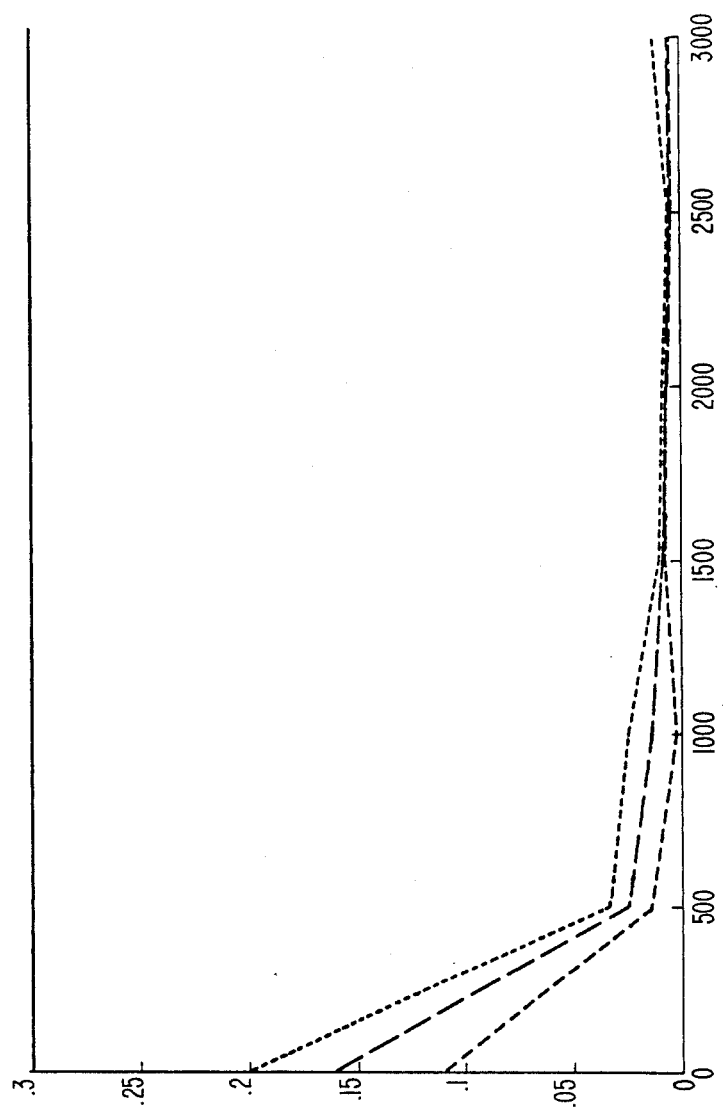
FIG. 1 is a graph showing the relationship of the operating life to the leakage current of a representative electrolytic capacitor of the invention.

While significantly improved results have been achieve by the use of electrolyte compositions coming within the scope of the broad aspect of the invention, it has been found that a further improvement may be achieved when 60-90. wt. % of the electrolyte is the butyrolactone or the amide or the mixtures of the amides, up to 30 wt. % is the polyalkylene glycol and about 5.0-20.0 wt. % is the boric acid.

Preferably the polyethylene glycol is present in a concentration of at least about 7.0 wt. %.

Examples of amines that may be employed are diethylamine, tripropylamine and piperidene.

Phosphoric acid may be present in an amount up to about 0.5% by weight.

Preferably about 2 moles of the boric acid are present in the electrolyte for each mole of the polyalkylene glycol and the amine.

When dimethylacetamide is used as a solvent without dimethylformamide the addition of up to about 17% by weight of N-methylacetamide has been found to increase the operating temperature range of the capacitor to as low as −40° C.

The invention will now be described in greater detail with reference to the drawing and to the examples that follow.

| FORMULATION A | |
|---|---|
| Chemical | Amount |
| Dimethylacetamide | 66.75 wt % |
| Diethylene Glycol | 7.00 |
| Boric Acid | 8.00 |
| The above is stirred until all the boric acid is dissolved. Then add: | |
| 85% Phosphoric Acid | 0.025 |
| *LCCA | 0.50 |
| Diethylamine | 1.75 |
| N—Methylacetamide | 16.00 |

*LCCA = aliphatic long chain dicarboxylic acid with >14 carbons between the carboxylic groups as described in applicant's copending application Ser. No. 284,206 filed December 14, 1988.

The resistivity at 30° C. is approximately 700 ohm.cm. The scintillation voltage is greater than 500V. There is a plateau in the scintillation curve at about 440V apparently due to the phosphate. The use of the small amount of 85% Phosphoric Acid, LCCA or the co-solvent, N-Methylacetamide, it not necessary to the attaining of the high operating voltages.

Note that the above formulation makes use of the low boiling diethylamine. In order to reduce the vapor pressure and prevent the loss of the base by evaporation, high boiling amines are of interest. This is shown in the following trail:

| FORMULATION B | |
|---|---|
| Chemical | Amount |
| Dimethylacetamide | 67.00 wt % |
| Diethylene Glycol | 7.00 |
| Boric Acid | 8.00 |
| The above was stirred until all boric acid had dissolved, then add: | |
| Piperidine | 2.00 |
| N—Methylacetamide | 16.00 |

The properties of this composition was measured before and after its exposure to 105° C. for 125 Hr. The results were as follows:

| | Initial | Final |
|---|---|---|
| Resistivity, ohm.cm 30° C. | 767 | 602 |
| 10% pH | 8.29 | 8.11 |
| 100% pH | 9.29 | 9.29 |
| Scintillation Voltage, 85° C. | 483 | 472 |

| FORMULATION C | |
|---|---|
| Chemical | Amount |
| Dimethylformamide | 61.00 wt % |
| Dimethylacetamide | 12.00 |
| Diethylene glycol | 10.25 |
| Boric Acid | 12.00 |
| Stir till all boric acid is dissolved; | |
| 85% Phosphoric Acid | 0.025 |
| Tipropylamine | 4.75 |

This composition had neither citric acid nor butyrolactone, but the scintillation voltage was high, about 500V at 85° C. The resistivity was found to be 675 ohm.cm at 30° C. Other compositions have been made using Triethylene glycol and polyethylene glycol 200 which gave the same high scintillation voltages.

Capacitors which were rated for use at 300V were made with the Formulation A above. In these capacitors a paper spacer separating aluminum anode and cathode members was impregnated with the electrolyte of composition. As the cover for the capacitors a nylon material sold under the trademark Vydyne was used and no potting compound was used. These were tested at 300V in a 105° C. oven. The capacitors were removed from test every 500 Hr and electrical measurements performed after they had cooled to room temperature. This test was continued until a clear mode of failure was evident. This was the case 2500 hr. The capacitors appear to slowly dry out due to loss of chemicals from the formulation. This results in excessive increase of ESR of the capacitors. This and other data are shown in the drawing.

In the graph shown in FIG. 1 of the drawing, variation in the maximum, average and lowest values of leakage current is plotted as a function of the operating life of a number of these capacitors.

Figure 2:
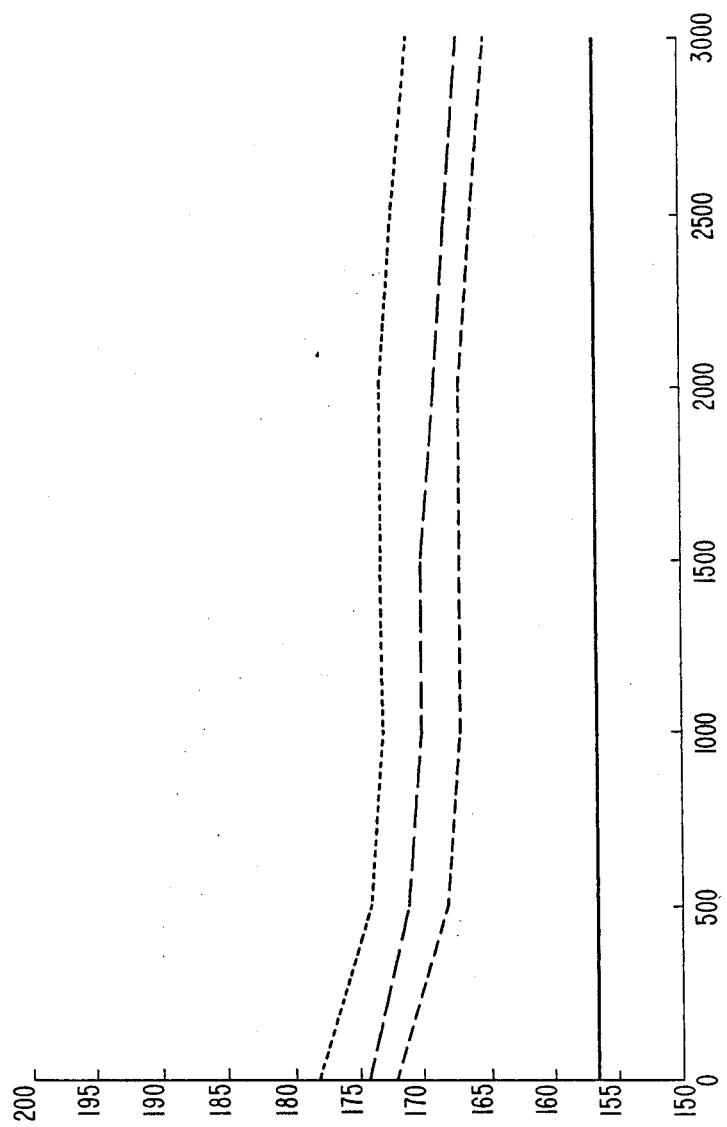
FIG. 2 is a graph showing the relationship of the operating life to capacitance of this capacitor.

In the graph shown in FIG. 2 of the drawing, the variation in the maximum, average and minimum values of capacitance is plotted as a function of the operating life of a number of these capacitors.

Figure 3:
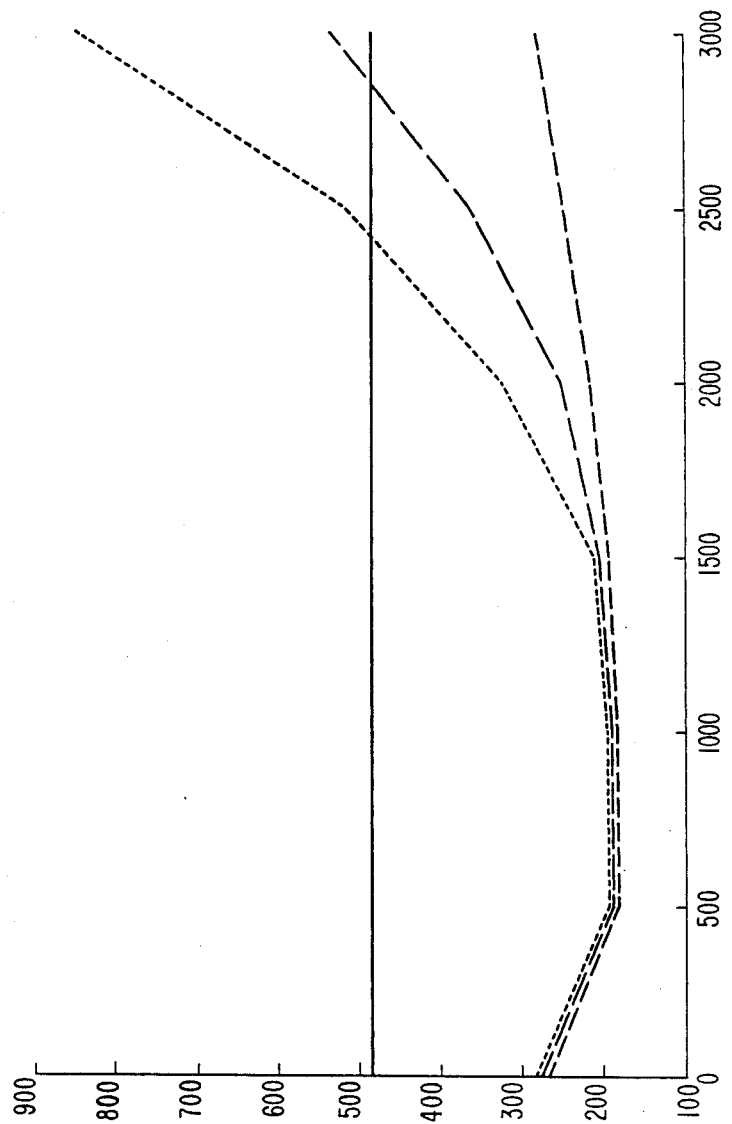
FIG. 3 is a graph showing the relationship of the operating life to equivalent series resistance (ESR) of this capacitor.

In the graph of FIG. 3 of the drawing the variation in ESR in the maximum, average and minimum values of the ESR of a number of these capacitors is plotted as a function of their operating lives.

The following composition illustrates the use of a heavier polyglycol, polyethylene glycol, 200. The "200" refers to the average molecular weight of the material. This material is thus mostly four ethylene groups long, or it may be considered to be mostly tetraethylene glycol.

| FORMULATION D | |
|---|---|
| Chemical | Amount |
| Dimethylformamide | 85.00 wt % |
| Polyethylene glycol, 200 | 8.00 |
| Boric Acid | 5.00 |
| the mix is then stirred till al boric acid dissolves | |
| Phosphoric Acid, 85% | 0.025 |
| Tripropylamine | 2.00 |
| The initial properties of this composition were found to be: | |
| Resistivity, at 30° C., ohm.cm | 808 |
| 10% pH | 8.65 |
| 100% pH | 7.90 |
| Scintillation Voltage, 85° C. | 580 |

What is claimed is:

1. An electrolytic capacitor particularly adapted for use over a wide temperature range and at a medium to high operating voltage comprising aluminum anode and cathode members separated by an insulating spacer impregnated with an electrolyte consisting essentially of a solution of boric acid and an amine of a molecular weight of not greater than about 175 in a mixture of a member of the group consisting of butyrolactone, dimethylacetamide and dimethylformamide and mixtures of dimethylacetamide and dimethylformamide in a major amount and a polyalkylene glycol of a molecular weight of not greater than about 2000 in a minor amount, said electrolyte being free of aliphatic dibasic acids.

2. The capacitor of claim 1 wherein the electrolyte contains about 60–90. wt. % of a member of the group consisting of butylactone, dimethylacetamide and dimethylformamide and mixtures of dimethylacetamide and dimethylformamide, said polyalkylene glycol in an amount not greater than about 30 wt. % and boric acid in an amount of about 5.0–20.0 wt. %.

3. The capacitor of claim 2 wherein about 2 moles of boric acid are present for each mole of the polyalkylene glycol and of the amine.

4. The capacitor of claim 3 wherein the polyalkylene glycol is a member of the group consisting of diethylene glycol and dipropylene glycol.

5. The capacitor of claim 4 wherein the amine is a member of the group consisting of diethylamine, piperidene and tripropylamine.

6. The capacitor of claim 5 wherein the electrolyte contains up to about 0.5 wt. % of phosphoric acid.

7. The capacitor of claim 6 wherein dimethylacetamide is present and up to about 17% by weight of N-methylacetamide is present in the electrolyte.

8. The capacitor of claim 5 wherein dimethylacetamide is present and up to about 17% by weight of N-methylacetamide is present in the electrolyte.

9. The capacitor of claim 3 wherein the amine is a member selected from the group consisting of diethylamine, piperidene and tripropylamine.

10. The capacitor of claim 2 wherein the electrolyte contains up to about 0.5 wt. % of phosphoric acid.

* * * * *